(12) United States Patent
Ponsini et al.

(10) Patent No.: US 9,871,821 B2
(45) Date of Patent: Jan. 16, 2018

(54) SECURELY OPERATING A PROCESS USING USER-SPECIFIC AND DEVICE-SPECIFIC SECURITY CONSTRAINTS

(71) Applicant: Oracle International Corporation, Redwood Shores, CA (US)

(72) Inventors: Nicolas Ponsini, Mougins (FR); Eric Vetillard, Valbonne (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 504 days.

(21) Appl. No.: 14/538,514

(22) Filed: Nov. 11, 2014

(65) Prior Publication Data

US 2016/0134660 A1    May 12, 2016

(51) Int. Cl.
| | | |
|---|---|---|
| G06F 15/00 | (2006.01) | |
| G06F 13/00 | (2006.01) | |
| H04L 29/06 | (2006.01) | |
| G06F 9/445 | (2006.01) | |
| H04L 9/32 | (2006.01) | |

(52) U.S. Cl.
CPC .............. H04L 63/20 (2013.01); G06F 8/61 (2013.01); H04L 9/3247 (2013.01); H04L 63/08 (2013.01); H04L 63/102 (2013.01); H04L 2209/64 (2013.01)

(58) Field of Classification Search
CPC ............................ G06F 21/57; G06Q 10/06
USPC .................. 715/744, 780, 851–853, 765
See application file for complete search history.

(56) References Cited

U.S. PATENT DOCUMENTS

| 9,100,172 B2* | 8/2015 | Kim ........................ H04L 67/34 |
| 2009/0254572 A1* | 10/2009 | Redlich ................... G06Q 10/06 |
| 2010/0250497 A1* | 9/2010 | Redlich .................... F41H 13/00 |
| | | 707/661 |
| 2013/0133061 A1* | 5/2013 | Fainkichen .............. C09J 7/041 |
| | | 726/15 |
| 2014/0032691 A1* | 1/2014 | Barton ..................... H04L 41/00 |
| | | 709/206 |
| 2014/0096226 A1* | 4/2014 | Barkan ................... G06F 21/57 |
| | | 726/11 |

* cited by examiner

*Primary Examiner* — Kevin Nguyen
(74) *Attorney, Agent, or Firm* — Fish IP Law, LLC

(57) ABSTRACT

A method for enforcing secure processes between a user and a device involves determining that the user has initiated installation of a secure application, installing the RA part of the secure application, triggering a trusted UI session upon realization that the TA part of the secure application is not installed, receiving, via the trusted UI session, user credentials for authenticating the user and enforcing user-specific and device-specific security, cryptographically signing combined user credentials with a cryptographic signature to obtain an authentication object, passing the authentication object to a service provider associated with the secure application for extraction of the user credentials, and generating an authorization token permitting the installation of the TA part of the secure application upon verification of the cryptographically signed authentication object.

22 Claims, 5 Drawing Sheets

SECURELY OPERATING A PROCESS USING USER-SPECIFIC AND DEVICE-SPECIFIC SECURITY CONSTRAINTS

BACKGROUND

A single mobile device/tablet may have different owners during its lifetime. Conventionally, a user is linked to a service provider by a user account created by the user. The user account is used by service providers to install applications within the device. The user is identified/authenticated on the device itself, at the rich execution environment (REE) level of the operating system (OS) of the device, and credentials are exchanged with the service provider back-end infrastructure to facilitate authentication of the user.

SUMMARY

In general, in one aspect, embodiments disclosed herein relate to a method comprising determining that a user has initiated an installation of a secure application on a device owned by the user, the secure application comprising a rich application (RA) part and a trusted application (TA) part, wherein the rich application part operates using resources shared with other applications, and wherein the trusted application part operates in an isolated execution environment with functionality to provide security services to the rich application part, installing the RA part of the secure application on the device, triggering, by the RA executing on the device, a trusted user interface (UI) session, upon realization that the TA part of the secure application is not installed in the isolated execution environment on the device, wherein the trusted UI session is initiated to enforce user-specific and device-specific security criteria, receiving, via the trusted UI session, user credentials for authenticating the user, combining the user credentials with a unique identifier of the isolated execution environment in which the TA part of the secure application operates to obtain combined user credentials, cryptographically signing the combined user credentials with a cryptographic signature to obtain an authentication object, wherein the authentication object facilitates the enforcement of the user-specific and the device-specific security criteria, passing the authentication object to a service provider associated with the secure application for extraction of the user credentials, and generating, by an authorization entity, an authorization token permitting the installation of the TA part of the secure application, upon verification of the cryptographically signed authentication object.

In general, in one aspect, embodiments disclosed herein relate to a system, comprising a device on which the installation of a secure application is initiated by a user, wherein the device is owned by the user, a service provider configured to provide the secure application to be installed on the device, the secure application comprising a rich application (RA) part and a trusted application (TA) part, wherein the rich application part operates using resources shared with other applications, and wherein the trusted application part operates in an isolated execution environment with functionality to provide security services to the rich application part, and a back-end server comprising an authorization entity configured to generate an authorization token permitting installation of the TA part of the secure application, upon verification of an authentication object, wherein, when installation of the secure application is initiated by the user, the RA is configured to request a user-binding TA in the isolated execution environment to initiate a trusted user interface (UI) session by which user credentials are obtained from the user, wherein the authentication object is generated by: combining the user credentials obtained via the trusted UI session with a unique identifier of the isolated execution environment on the device to obtain combined user credentials, and cryptographically signing the combined user credentials using a cryptographic signature to obtain the authentication object, wherein the service provider is further configured to receive the authentication object from the RA part of the secure application to check the user credentials, and wherein the back-end server is configured to verify the cryptographically signed authentication object, and, using the verified authentication object, generate the authorization token authorizing the installation of the TA part of the secure application.

In general, in one aspect, embodiments disclosed herein relate to a non-transitory computer readable medium comprising instructions that, when executed by a computer processor, perform a method comprising determining that a user has initiated an installation of a secure application on a device owned by the user, the secure application comprising a rich application (RA) part and a trusted application (TA) part, wherein the rich application part operates using resources shared with other applications, and wherein the trusted application part operates in an isolated execution environment with functionality to provide security services to the rich application part, installing the RA part of the secure application on the device, triggering, by the RA executing on the device, a trusted user interface (UI) session, upon realization that the TA part of the secure application is not installed in the isolated execution environment on the device, wherein the trusted UI session is initiated to enforce user-specific and device-specific security criteria, receiving, via the trusted UI session, user credentials for authenticating the user, combining the user credentials with a unique identifier of the isolated execution environment in which the TA part of the secure application operates to obtain combined user credentials, cryptographically signing the combined user credentials with a cryptographic signature to obtain an authentication object, wherein the authentication object facilitates the enforcement of the user-specific and the device-specific security criteria, passing the authentication object to a service provider associated with the secure application for extraction of the user credentials, and generating, by an authorization entity, an authorization token permitting the installation of the TA part of the secure application, upon verification of the cryptographically signed authentication object.

Other aspects will be apparent from the following description and the appended claims.

DETAILED DESCRIPTION

Figure 1:
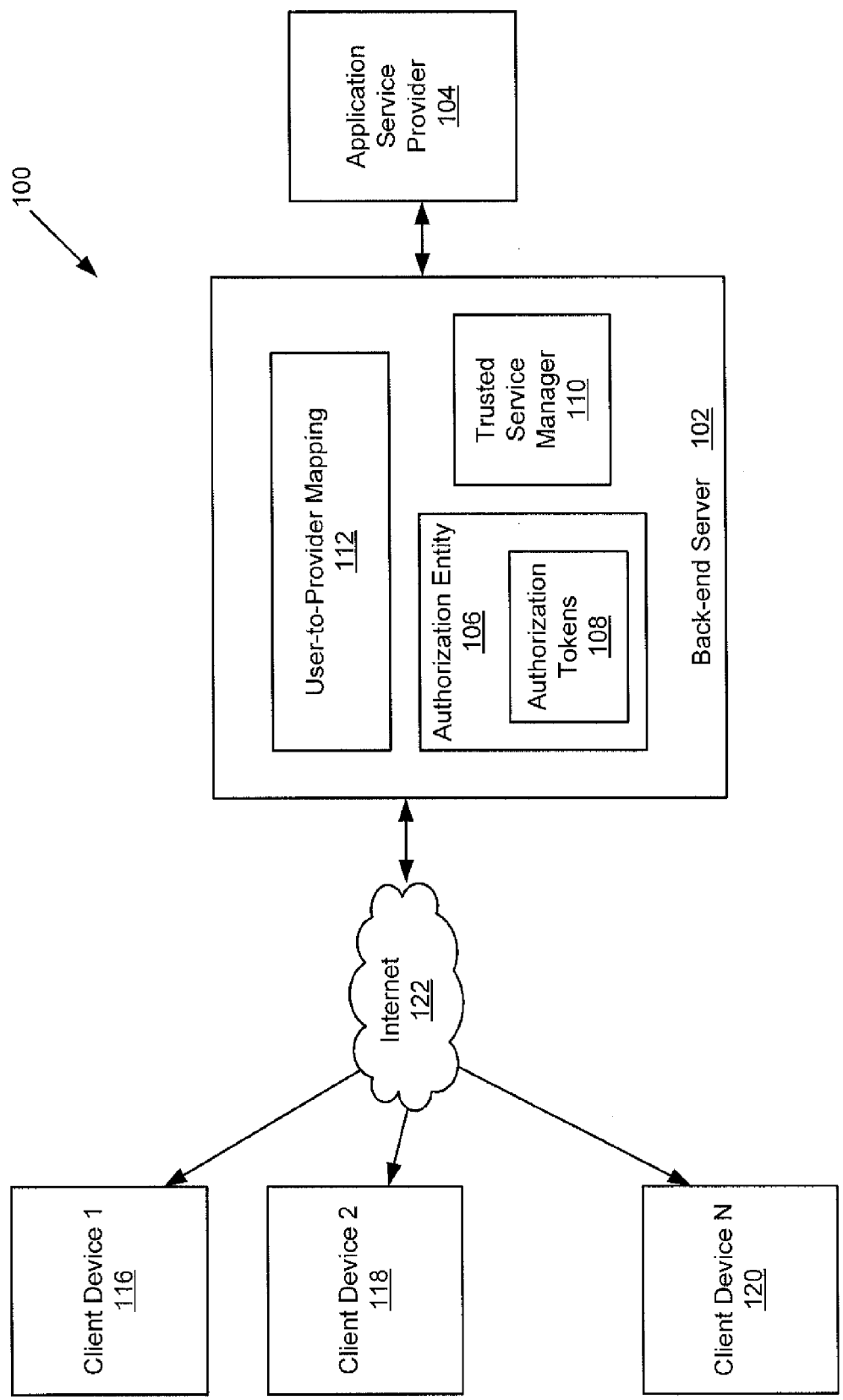
FIGS. 1-2 show schematic diagrams in accordance with one or more embodiments disclosed herein.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments disclosed herein may be practiced without these specific details. In other instances, well-known features have not been described in detail to avoid unnecessarily complicating the description.

In general, one or more embodiments disclosed herein provide a method and system for binding a user to his/her device. Binding a user to a device results in the enforceability of user-specific and device-specific security criteria. Specifically, one or more embodiments relate to associating a user to the trusted execution environment (TEE) of his/her device in order to remotely manage sensitive applications related to the user within his/her device.

FIG. 1 shows a schematic diagram of a client/server topology in accordance with one or more embodiments. Specifically, FIG. 1 shows a system (100) including a back-end server (102) and multiple client devices (116, 118, 120) with which the back-end server (102) communicates based on input from an application service provider (104). Each of the aforementioned components of the system (100) are described below.

Each client device (116, 118, 120) may be a portable electronic device such as a smart phone, tablet, gaming device, or any other suitable electronic device having Internet capability. In one or more embodiments, each device (116, 118, 120) may include a trusted execution environment (TEE). More specifically, TEE software may be installed by the client device manufacturer such that the TEE software automatically executes on the client (116, 118, 120) for certain applications which require use of sensitive data. Content providers of secure applications (i.e., applications which require user sensitive data) must comply with the TEE platform and structural requirements. The TEE environment is discussed in detail in FIG. 2 below.

In one or more embodiments, TEE is a secure area in the client device (e.g., a smart phone, tablet, or any other suitable electronic device) and ensures that sensitive data is stored, processed and protected in a trusted environment. More specifically, the client device operating system (OS) may be partitioned into a rich execution environment (REE) and the TEE. The TEE is an isolated execution environment with its own set of hardware and software components that runs in parallel with but separate from the REE, providing security services to the Rich OS environment. REE is an environment that is provided and governed by the Rich OS, which is outside of the TEE. The Rich OS is a more complete OS, developed with functionality and performance as key goals, rather than security, and thus, runs with lower security boundaries. From the perspective of the TEE, the REE and applications running on the REE are considered un-trusted. In contrast, the TEE executes a trusted OS, which is designed to enable the TEE using security based design techniques.

Returning to the description of FIG. 1, each client device (116, 118, 120) may be operated by a user (not shown). The user may be any person or entity using the client device. The client device (116, 118, 120) may be owned by the user, or in one or more embodiments of the user, may be owned by a company, university, government agency or other entity that permits the use of the client device by the user, for example. In one or more embodiments, the mapping between the user and the TEE executing on the client device (116, 118, 120) depends on the owner of the client device at a given time. Each client device (116, 118, 120) executes applications known as trusted application (TAs) within the TEE. The TA is configured to manage sensitive information on behalf of the user of the client device or the service provider (104). To this end, embodiments disclosed herein ensure that a TA is managed within the correct TEE that is bound to the user.

In one or more embodiments, the back-end server (102) is a server configured to manage remote options on the client device by generating and transmitting authorization tokens. More specifically, the back-end server (102) is configured to sign and authorize a TA to be installed within the TEE of a client device prior to installation of the TA on the client device (116, 118, 120). In one or more embodiments, the back-end server (102) includes an authorization entity (106), a trusted service manager (110) and a user-to-TEE mapping (112).

The authorization entity (106) is a server side authority configured to authorize remote operations such as installing/deploying of TAs, upgrading of TA software on the client, de-installing TAs, etc., on the client device (116, 118, 120). The authorization entity (106) may be the owner of the device hosting the SoC, the original equipment manufacturer (OEM), or a third party. The authorization entity (106) communicates with each client device (116, 118, 120) via the Internet (122), any other suitable network, or using any other form of communication among components on one or more devices. The authorization entity includes functionality to generate authorization tokens (108). More specifically, the authorization entity (106) authorizes remote operations of the TEE by signing related authorization tokens (108). The authorization entity has a counterpart component within the client device TEE. This counterpart component (not shown) resides in the TEE on the client device and hosts the cryptographic key that is used by the authorization entity to cryptographically sign authorization tokens directed to that particular TEE. In one or more embodiments, in order to restrict the authorization tokens (108) for a TA management operation to a given TEE, the authorization entity (106) binds the authorization of a remote operation related to a TA to a given TEE identifier. Details on how such a binding is performed is discussed in FIGS. 3-4 below.

In one or more embodiments, the back-end server (102) also includes a trusted service manager (TSM) (110). The TSM (110) is a communication entity that provides secure communication within a given client device in the field. Specifically, in one or more embodiments, the TSM (110) receives the authorization token (108) generated by the authorization entity (106), and passes the authorization token and related administrative operations to the counterpart component representing the authorization entity within the TEE on the client device (116, 118, 120).

The user-to-provider mapping (112) on the back-end server (102) is a service provided by the back-end server (102) and the TEE that is configured to store a data structure such as a table, a list, etc., mapping each client device (116, 118, 120) to the TEE identifier that uniquely identifies the TEE on the client device, as well as a cryptographic key unique to each device, which may be used to verify the authenticity of user-binding requests. More specifically, the user-to-provider mapping (112) uses the TEE to map a physical user to an account linked to the ASP (104). The user-to-provider mapping (112) may optionally store a list of the applications installed on the client device, and/or a number of times a particular type of operation has been approved by the user, etc.

In one or more embodiments, the ASP (104) is configured to request to perform an operation on the client device through the back-end server (102). The ASP (104) may be any application content provider that is responsible for managing the applications on the client device. More specifically, the ASP (104) is an entity that is willing to leverage the benefit of having a TA within TEEs to secure their TEE applications. In one or more embodiments, an application provided by the ASP (104) may be divided into two parts: an ASP REE application part and an ASP TEE application (or SP TA) part. The ASP (104) may install the ASP REE application part within the REE on the client device and delegate all sensitive operations and store all sensitive data within the related ASP TA part within the TEE on the client device. Such a divided two part application may be implemented when the ASP (104) is a content provider for trusted/secure applications executing in the TEE of the client, such as, for example, a banking service provider, a payment systems service provider, etc. The ASP (104) may also be the company or entity that owns the client device, when the client device is not a personal device of the user operating the client device. In one or more embodiments, the ASP (104) has a trusted relationship with the trusted authority (106) of the back-end server (102). That is, the ASP (104) is pre-authenticated with the back-end server (102), thereby allowing the back-end server (102) to trust that the content provided by the ASP (104) is secure content. The ASP (104) may pay the authorization entity (106) to have the ability to install its TA within the TEE of the client device of a user who paid for the ASP service. The ASP (104) may also optionally pay the TSM to manage its related TA online.

In one or more embodiments, the ASP (104) may request to perform any type of device management operation on the TEE client (116, 118, 120). For example, the ASP (104) may request to install/deploy an application in the TEE environment of the client device. Alternatively, the ASP (104) may request to perform a security patch update to an essential application, uninstall an application from the client device, or any other suitable management operation associated with applications executing on the client device.

The invention is not limited to the system shown in FIG. 1.

Figure 2:
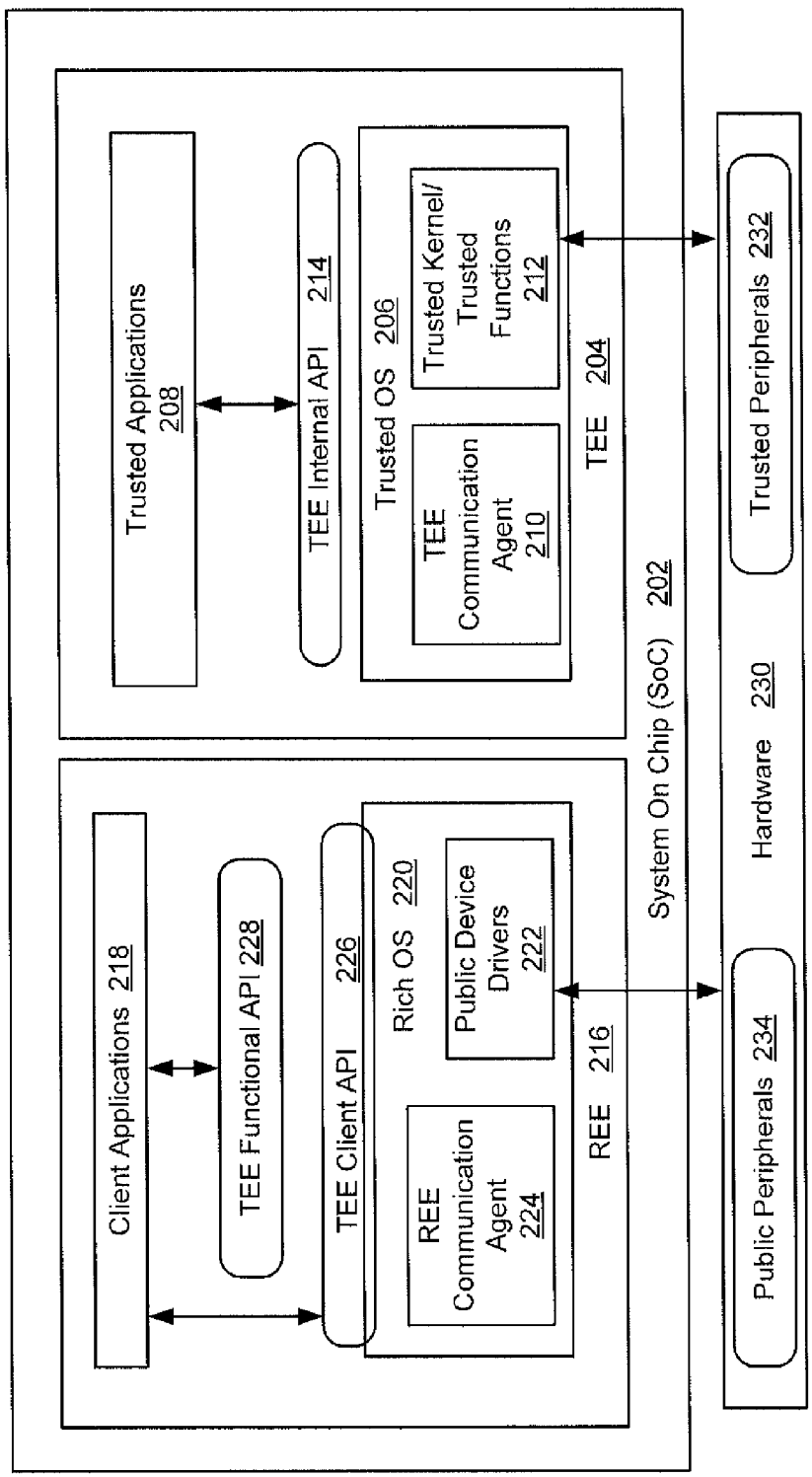

FIG. 2 shows an example system architecture that may be implemented on a client device. Specifically, FIG. 2 shows the SoC (202) hosting the REE (216) and the TEE (204) executing on the client device. Both the REE (216) and the TEE (204) interface with the hardware (230) of the client device. Each of the aforementioned components are described in detail below.

Initially, it is noted that the TEE architecture enables a level of security sufficient for a significant number of applications upon which the application service provider may wish to perform an operation. In one or more embodiments, the TEE is configured to perform sensitive operations subject to security protection on the client device, such as, for example, banking operations, payment operations, etc. The TEE architecture is defined in the document entitled "GlobalPlatform Device Technology TEE System Architecture" version 1.0, dated December 2011. The communication between applications running in a rich operating environment and the applications residing in the TEE is defined in the document entitled "GlobalPlatform Device Technology TEE Client API Specification" version 1.0, dated July 2010. The TEE system architecture and the TEE Client API Specification are incorporated by reference in their entirety. The invention is not limited to a particular version of TEE architecture or a particular version of the Client API Specification.

Turning to FIG. 2, the SoC (202) is an electronic subsystem on the device, all of whose components are included in a single integrated circuit. In one or more embodiments, both the REE (216) and the TEE (204) are part of the SoC in a typical chipset architecture. The TEE (204) may be made up of a separate on-chip security subsystem within the SoC, or may operate as a portion of each of the SoC components (i.e., the RAM, ROM, Crypto Accelerators, Processing Core(s), peripherals, etc.). As described above, the primary purpose of the TEE is to protect its assets from the REE (216) through hardware mechanisms which are beyond the REE's control. For example, the TEE provides trusted storage of data and keys, where the storage of data is bound to the device so that no unauthorized internal or external attacker may access, copy, or modify the data contained within the TEE.

Each of the REE (216) and the TEE (204) include similar components that are specific to the environment in which the components execute. For example, the REE (216) includes client applications (218) which are typically not secure applications requiring use of sensitive data, and correspondingly, the TEE (204) includes TEE applications also named trusted applications (208) which provide security related functionality to client applications (218) outside of the TEE (i.e., in the REE). A client application is any application that runs in the REE, and a trusted application is any application that runs in the TEE. A client application may use one or several trusted applications. For example, PayPal® is a client application, which may use a trusted application to manage its credentials (the "PayPal credential management" trusted application). In one or more embodiments, when secure applications are downloaded by the user of the device, the secure applications are installed in two parts; first, the RA part is installed onto the device, and subsequently, after binding of the user to the device/TEE, the TA part of the application is installed.

Continuing with FIG. 2, the TEE functional API (228) in the REE (216) is an REE software interface dedicated to exposing an inbuilt TEE capability, such as cryptography, for the client application (218) developer. On the TEE (204) side, the TEE exposes sets of application programming interfaces (APIs) to enable communication from the REE and others to use trusted software functionality within the TEE. More specifically, the trusted OS is the hosting code that provides an internal API to trusted applications which run on top of the trusted OS, and a proprietary method to enable the client device API software to interface with the TEE from other execution environments. The TEE internal API (214) is one of these APIs exposed by the Trusted OS (206) to trusted applications (208), allowing them to exploit the features defined in the trusted OS (206) and to communicate with the Rich OS (220).

On the REE (216) side, the TEE client API (226) is a communication interface designed to enable a client application running in the Rich OS (220) to access and exchange data with a trusted application (208) in the TEE (204). The Rich OS (220) is an OS providing a wider variety of features than that of the Trusted OS (206) in the TEE (204). The Rich OS is built with functionality and performance as key goals, and has an open ability to accept applications. The Rich OS (220) includes a REE communication agent (224) and a public device drivers (222). The REE communication agent (224) is a Rich OS (220) driver that enables communication between the REE (216) and the TEE (204). Public device drivers (222) are drivers which allow communication with public peripherals (234) in the device hardware (230). Public peripherals (234) may include input/output devices. As the REE cannot directly call to TEE functions, the REE software goes through protocols such that the trusted OS or TA performs the verification of the acceptability of any operation that the REE software requests.

In contrast, the Trusted OS (206) is limited in that it is built to enable the TEE using security based design techniques. The Trusted OS (206) provides the TEE internal API to TAs (208) and a proprietary method to enable the TEE client API software interface from other execution environments. The Trusted OS (206) includes a TEE communication agent (210) and a trusted kernel/trusted functions (212). The TEE communication agent (210) is a Trusted OS (206) driver that enables communication between the REE (216) and TEE (204). The trusted kernel/trusted functions (212) are Trusted OS (206) components dedicated to exposing an inbuilt TEE capability, such as cryptography. The trusted kernel/trusted functions (212) also allow for communication with trusted peripherals (232) in the device hardware (230). Trusted peripherals (232) may include input/output devices associated with a trusted UI session (described in detail below). Further, although not shown in FIG. 2, the TEE is configured to provide trusted storage of data and keys such that no unauthorized internal or external attacker may access, copy, or modify the data contained in trusted storage.

The invention is not limited to the system architecture shown in FIG. 2.

Figure 3:
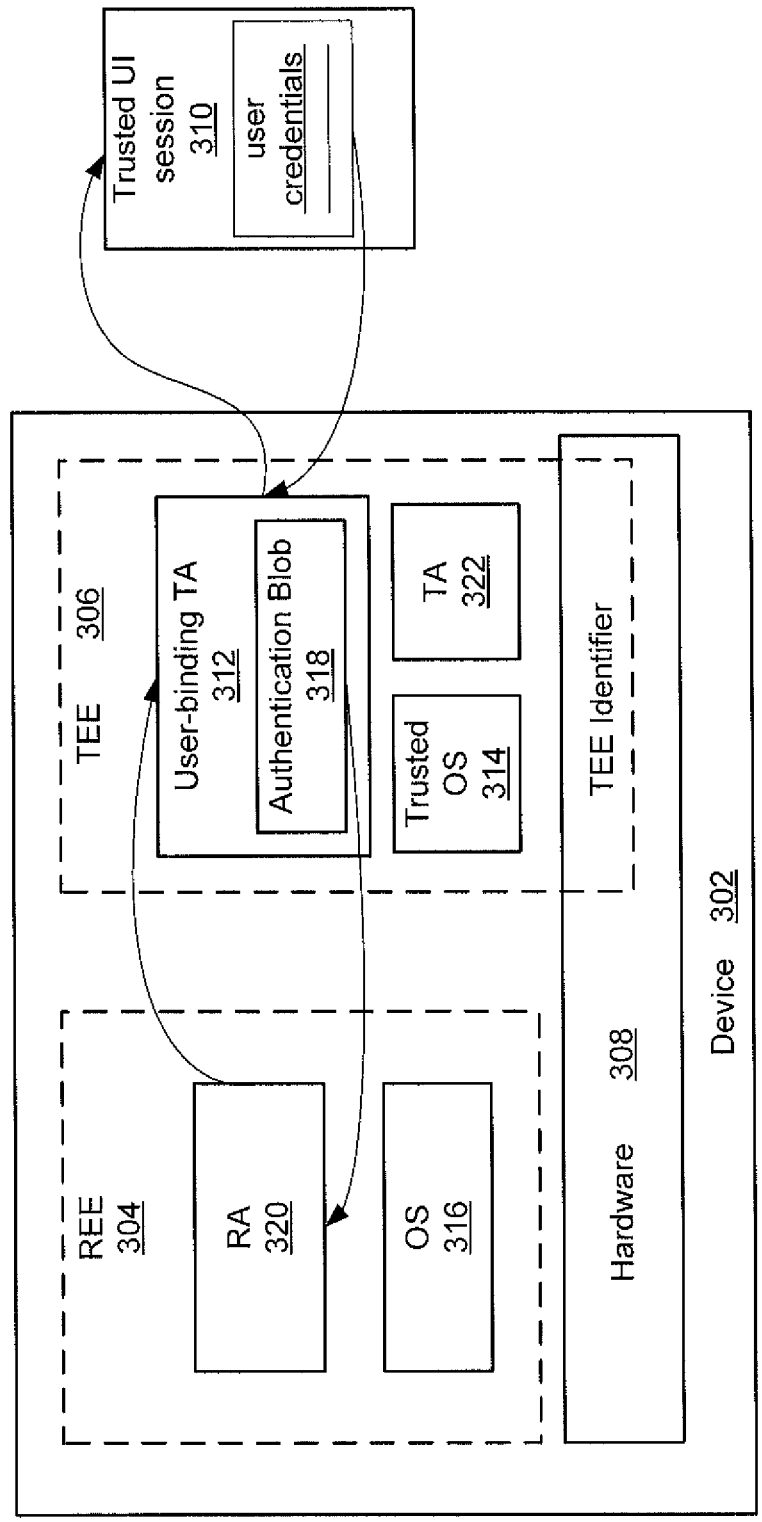
FIG. 3 shows an example implementation of binding a device to a user in accordance with one or more embodiments disclosed herein.

FIG. 3 shows an example implementation for binding a user to the TEE of his/her device. FIG. 3 shows a device (302) having an REE (304), a TEE (306) and hardware (308), which may include peripheral devices, such as input/output devices. Each of these components are described in detail below.

As described above, embodiments of the invention provide a system and method to identify/authenticate a user and bind the user to the TEE (306) associated with the device (302), by relying on the robustness of the TEE itself. As described generally with respect to FIG. 2 above, the REE (304) runs separate from the TEE (306), and includes its own set of applications (320) and a Rich OS (316). Applications executing in the REE (304) are not used for sensitive data, and thus, the REE application (RA) (320) may be any application that does not require user credential information, financial information, or other sensitive information to be input by the user. The TEE (306) hosts a trusted OS (314) and a TA (322) associated with the RA (320), which may be used by the RA (320) running in the REE to delegate sensitive security operations, which must be performed on the TEE. In other words, an RA (320) may have a TA (322) counterpart hosted by the TEE (306), which the RA (320) uses for secure operations. For example, a banking application may systematically leverage the TEE (306), and may have one or more trusted application (TA) parts corresponding to an RA, where the TA part is used to execute operations with the user's confidential and secure data. The RA portion of the application executes in the REE and does not handle sensitive data. In contrast, the TA part of the banking application may handle the sensitive data of the user and perform secure operations on behalf of the user. It is noted that application developers/service providers must code such applications to leverage the security features of the TEE, as use of the TEE, TAs within the TEE, and other TEE security features do not occur by default.

In one or more embodiments, when a user attempts to load the TA (322) application part of an ASP RA application, the user-binding process is initiated (described in FIG. 4 below). To this end, in one or more embodiments, the TEE (306) hosts a user-binding TA (312), which may be used by the RA (320) to establish a binding between the device (302) and a user account from the service provider (e.g., 104 in FIG. 1) who provided the RA (320). The user-binding TA (312) is a system TA that is always present as part of the TEE (306) and provides a user binding service to any REE application or any TA. More specifically, in one or more embodiments, the user-binding TA (312) executing on the TEE (306) is configured to identify and authenticate the user of the device via a trusted UI session (310). In one or more embodiments, the trusted UI session (310) may be initiated by the REE (304) and is a secure UI that is used to bind the user to the device, and by extension, the TEE (306) of the device. The user-binding TA (312) may be dedicated to a given service provider or to a group of service providers.

Alternatively, in one or more embodiments, the TA (322) part of a secure application may not be available when the RA (320) part is installed and first runs. In such cases, the user-binding TA (312) executing in the TEE (306) may be used by the RA (320) to perform a binding between the user and the device on behalf of the RA's (320) service provider (not shown in FIG. 3).

Continuing with the example of FIG. 3, the trusted UI session (310) is a graphical user interface presented to the user on the client device that is specifically associated with the TEE of the device or even the user of the device. The trusted UI session (310) is part of the global TEE platform. In one or more embodiments, the trusted UI session is a unique user interface that is noticeably distinct from the normal UT which is typically presented to the user for non-TEE related operations. Said another way, the trusted UI session (310) is specific to a device and may be customized by the user to present a security indicator of some type when the trusted UI session (310) is operating. The term UI as used herein may include the keyboard, the touchscreen, the biometric sensor, the screen/frame buffer, and more generally, any sensor or peripheral of the client device implying user input and/or output. For example, during a trusted UI session (310), a dedicated light (LED) on the device may be enabled when such a session is initiated. Alternatively, any other suitable UI feature may be presented to indicate the execution of a trusted UI session (310) that only the user knows, such as a word or phrase and/or a picture that the user provided may display on a portion of the UI screen. Accordingly, the user of the device recognizes the manner in which a trusted UI is presented and when a trusted UI session is running on the device. In one or more embodiments, the trusted UI session (312) is configured to query the user for user credentials and can be customized per and by a given ASP. User credentials may be a username/password, a one-time password (OTP), biometric information such as a fingerprint scan or retina scan, or any other suitable information that may be used to identify and authenticate the user of the device. The trusted UI session is also configured to protect the information provided by the user. The user credentials are not disclosed to the outside REE OS, but rather, stay only within the TEE (306) and are not accessible from other applications in the REE. In addition, the trusted UI session (310) wraps the user credentials cryptographically to protect the sensitive data. In one or more embodiments, the original version of the user credentials are deleted, and the trusted UI session (310) passes only the cryptographically wrapped version for validation and verification to the service provider via the REE (304).

In one or more embodiments, the TEE (306) is configured to obtain the user credentials from the user via the trusted UI session (310) and binds the user credentials to the TEE identifier of the TEE. In one or more embodiments the TEE identifier is stored in the hardware (308) of the device (302). The TEE identifier uniquely identifies the TEE installed on the device (302). In one or more embodiments, the TEE identifier may be the same as the device ID which uniquely identifies the device (302). In one or more embodiments, the user credentials may be hashed or encrypted and concatenated with the device ID/TEE identifier. The operation used to obtain the derived user credentials may be a Message Digest or any other suitable encryption operation using a cryptographic key. Alternatively, no operation on the user credentials may be performed, i.e., the operation is nil and the derived user credentials are equivalent to the original user credentials. In one or more embodiments, the derived user credentials are then used to generate what is known as an authentication object. In one or more embodiments, the authentication blob may be any authentication object, such as for example, an authentication binary large object (blob) (318). More specifically, the authentication blob (318) may be calculated by the following equation: Authentication Blob=(Derived(user credentials)+TEE Identifier). The entire authentication blob calculated by the above equation is cryptographically signed. Subsequently, the authentication blob (318) may be passed to the service provider that may verify the credentials and may pass the authentication blob to another entity (such as the authorizing entity) that may authenticates the authentication blob by verification of the cryptographic signature.

A variant is that the Authentication blob includes also the ASP information displayed during the Trusted UI session. The ASP information may be used to customize the Trusted UI session for a given ASP. Thus, in one or more embodiments, the Authentication Blob=(ASP information+Derived (user credentials)+TEE Identifier). Alternatively, in one or more embodiments, the Authentication blob may also include the ASP information displayed during the Trusted UI session. The ASP information may be used to customize the Trusted UI session for a given ASP. Thus, in one or more embodiments, the Authentication Blob=(Derived(ASP information)+Derived(user credentials)+TEE Identifier). The derived ASP information may be in clear, hashed or encrypted form.

The invention is not limited to the TEE architecture shown in FIG. 3.

Figure 4:
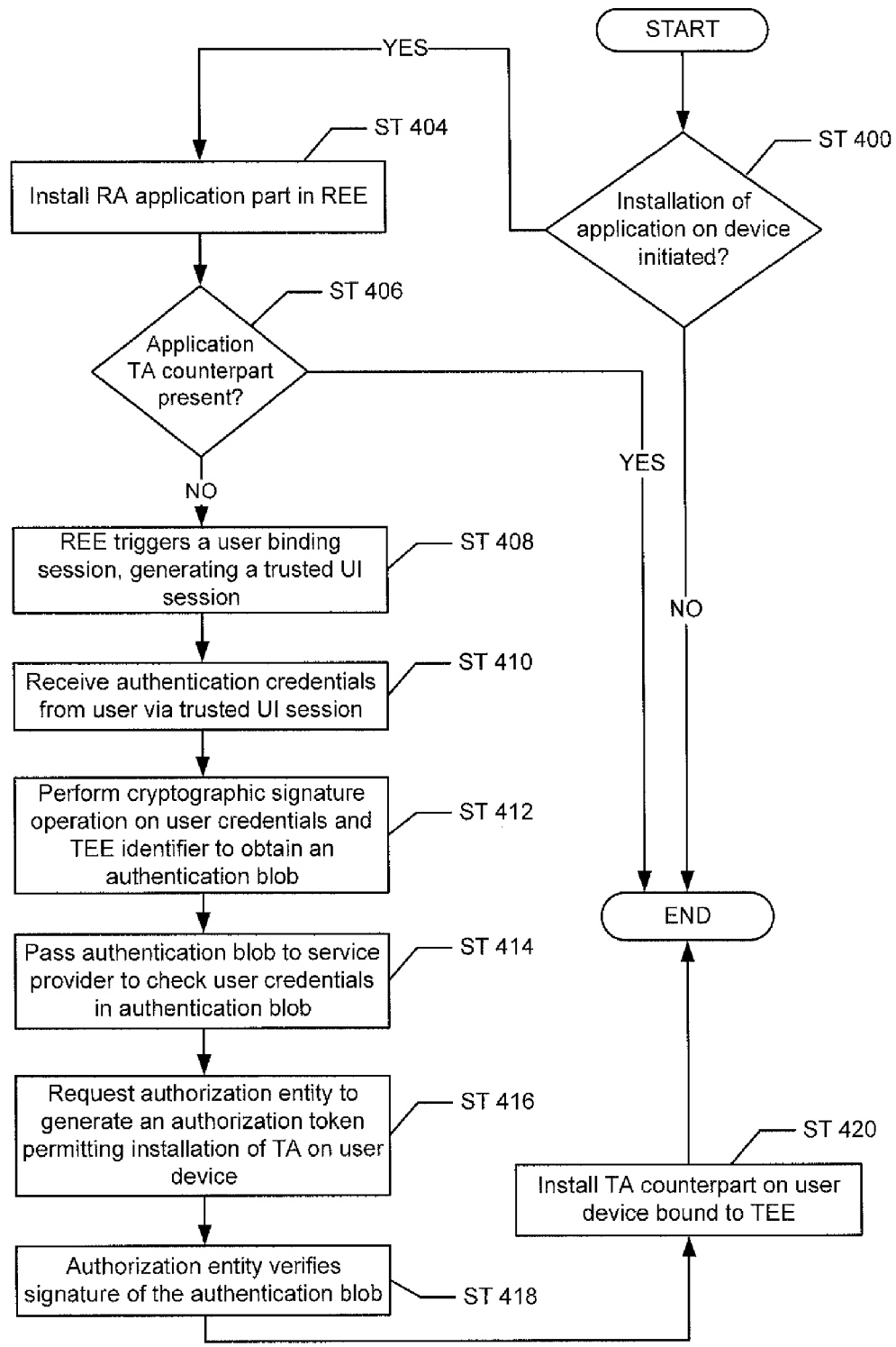
FIG. 4 shows a flowchart in accordance with one or more embodiments disclosed herein.

FIG. 4 shows a flowchart for binding a user to a device in accordance with one or more embodiments. More specifically, FIG. 4 describes the process that is performed by the systems of FIGS. 1-3 to facilitate user binding to the TEE of the user's device. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. By way of an example, determination steps may be performed by checking stored data to test whether the data is consistent with the tested condition in accordance with one or more embodiments.

Initially, a determination is made as to whether the installation of an application on the client device is initiated (ST 400). The installation of an application on the client device may be initiated by the user. Alternatively, the installation of an application on the client device may be initiated by the service provider with which that application is associated. That is, because the process of binding a user to the TEE of the user's device when installation of a trusted application that requires sensitive data of the user is initiated on the device, the initial step of the process (ST 400) require the determination to be made that the user wishes to install an application onto his/her device. Those skilled in the art would appreciate that when the installation of an application that executes completely within the REE is initiated, the process of FIG. 4 may end after step 404, or alternatively, wait until an operation associated with a TEE application is performed. That is, the process of FIG. 4 occurs whenever the user requires, i.e., at any time when the user downloads a secure application having both an RA part and a TA part.

Those skilled in the art would also appreciate that the user binding process is not limited to being performed when installation of a TEE application occurs. For example, the user binding process may also occur upon updating a TEE application on the device, un-installing a TEE application on the device, or any other suitable operation associated with a TEE application that may be performed on the device. More specifically, for example, the user binding process may also be initiated when a manufacturer installed TEE application requires a security patch.

Upon making the determinations that the application being installed (or updated, de-installed, etc.) is a TEE application, installation of the RA portion of the application commences (ST 404). At this stage, a determination is made as to whether the TA part of the application is present (ST 406). When the TA part of the application being installed by the ASP is already present in the TEE of the client device, the process ends. However, when the REE or RA part of a secure application notices that its corresponding TA part is not present, the REE triggers a user binding session (ST 408) through the user-binding TA (412). More specifically, in one or more embodiments, before the trusted application is installed, the REE portion of the application triggers the interaction with the user, via a trusted UI session (ST 408) managed by the user-binding TA. The trusted UI session appears on the UI (display screen) of the client device, which is recognized by the user as a secure session by at least one security identifier presented on the device, such as a colored LED light or a specifically sentence/phrase on the UI screen.

In this scenario, the RA application part requests the user-binding TA to establish a Trusted UI session and the user is prompted for user credentials by the trusted UI session (ST 410). As described above, the user credentials may be a username/password, biometric information, an OTP, etc. Upon receiving the user credentials from the user via the trusted UI session (ST 410), the user-binding TA wraps the user credentials in an encrypted layer for protection and discards the original user credentials. Next, the user-binding TA generates the authentication blob by performing a cryptographic signature operation on the derived user's credentials (ST 412). Specifically, the user-binding TA then performs one or more cryptographic operations to combine the user credentials with the device identifier of the device and with confidential and device-specific information stored in the user-binding TA. The resulting Authentication blob is then returned to the RA.

In one or more embodiments, at the time the authentication blob is generated in ST 412 (i.e., in parallel with ST 412, for example), the TEE identifier is obtained by the user-binding TA. More specifically, the user-binding TA obtains the TEE identifier during generation of the authentication blob, by making a trusted OS call to obtain the TEE identifier stored in the hardware of the device. At the end of ST 412, the Authentication blob is returned by the user-binding TA to the RA.

The Authentication blob may then be sent by the RA to the service provider (ST 414). The ASP is then able to extract and check the user credentials and device identifier from the authentication blob, and is further configured to have the user-to-provider mapping in the back-end server verify the authenticity of the request, based on cryptographic data that complements those used to build the Authentication blob and which are known to the ASP. Said another way, the ASP may check the authentication credentials (which are known to the ASP), inform the user-to-provider mapping that the credentials look correct to the ASP, and request the user-to-provider mapping to verify the same. In one or more embodiments, the RA may manage the input of user credentials, or obtain these credentials from other sources (e.g., from the Rich OS (316)). In that case, the RA may provide the user credentials to the user-binding TA and simply request the computation of an authentication blob.

Continuing with FIG. 4, at this stage, the user-to-provider mapping requests the authorization entity in the back-end server to generate an authorization token (ST 416). The authorization token, in one or more embodiments, authorizes the installation of the authentication TA part of the ASP application on the specific device of the user. The authorization entity subsequently also verifies the signature of the Authentication blob (ST 418), so that the authorization entity can guarantee the service provider that the generated authorization token is bound to the device of its user and not to another device. At this stage, the user is bound to the TEE of his/her device. Lastly, in ST 420, the TA part of the service provider application completes installation on the user device. Accordingly, once the user is bound to the TEE included on the device in ST 408-ST 418, the TA part of the divided ASP application initially requested to be downloaded by the user or the ASP is installed in the TEE of the device.

Although not shown in FIG. 4, the authorization entity in the back-end server may store a mapping of the user to the TEE identifier of the user's device to keep track of the owner of a particular device at a given time. In one or more embodiments, when the device is passed to a new owner, it is assumed that at least the initial user performed a factory reset on the device. Once a factory reset is performed, all applications installed within the TEE are wiped on the device. Accordingly, the process of FIG. 4 repeats to bind the TEE executing on the device to the new user/owner of the device. In one or more embodiments, the TEE identifier may additionally be bound to a given user of the device after factory reset i.e., the TEE identifier may be composed of a device ID and a binding ID generated each time a factory reset occurs.

The process of FIG. 4 described above results in a one-to-one mapping between the owner/user of a device and the TEE installed on the device. Thus, there exists a one-to-one binding between a single user, a single device, and a single application executing on the device, without any sharing of the authentication blob or user credential information. Those skilled in the art would appreciate that the process of FIG. 4 functions independently of the authentication method and of the organization of the authentication. For example, the user identity may be managed in the TEE, with a local authentication, or the user credentials may be included in the authentication blob and verified by the service provider upon receipt of the authentication blob. In one or more embodiments, a single operation is performed in which the application is installed, the application triggers the interaction with the user via the trusted UI session, and the content is secured. The second phase of this operation, during which the TA part is installed, is the personalization phase in which the user specific credentials are provisioned into the TA.

In one or more embodiments of the invention, after the process of FIG. 4 has executed and the TA part of a secure ASP application has been installed on the device, the TA part of the secure ASP application may be used to verify the identity of the user each time the user logs into the trusted application. For example, suppose that a secure banking application has been successfully installed on the client device using the process of FIG. 4. When the user uses the secure banking application to perform one or more banking operations, the RA application part may use the TA part of the banking application to obtain user credentials to log into the banking application. For example, this may be a username and password which logs the user into the secure banking application on the user's electronic device.

Those of ordinary skill in the art will appreciate that the user-binding method described in FIG. 4 is not limited to ensure a binding, authorizing installation of TA. Embodiments disclosed herein may be used for authorizing any application of the REE. Thus, although the invention is critical for TAs, any other application including REE applications may leverage the method of FIG. 4 to bind a user to a device.

Some operating systems allow multiple users having an account linked to the same device. While the TEE ID is still unique per client device, the user device binding process may permit identification and/or authentication from the back-end perspective as to which user is requesting the binding service because user credentials themselves are involved. Then, the back-end server and the TEE may apply a policy that may permit isolated TAs per user, in one or more embodiments.

One or more embodiments disclosed herein may be implemented on virtually any type of computing system regardless of the platform being used. Specifically, the authorization entity and each device described in FIG. 1 may be implemented on any type of computing system. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments.

Figure 5:
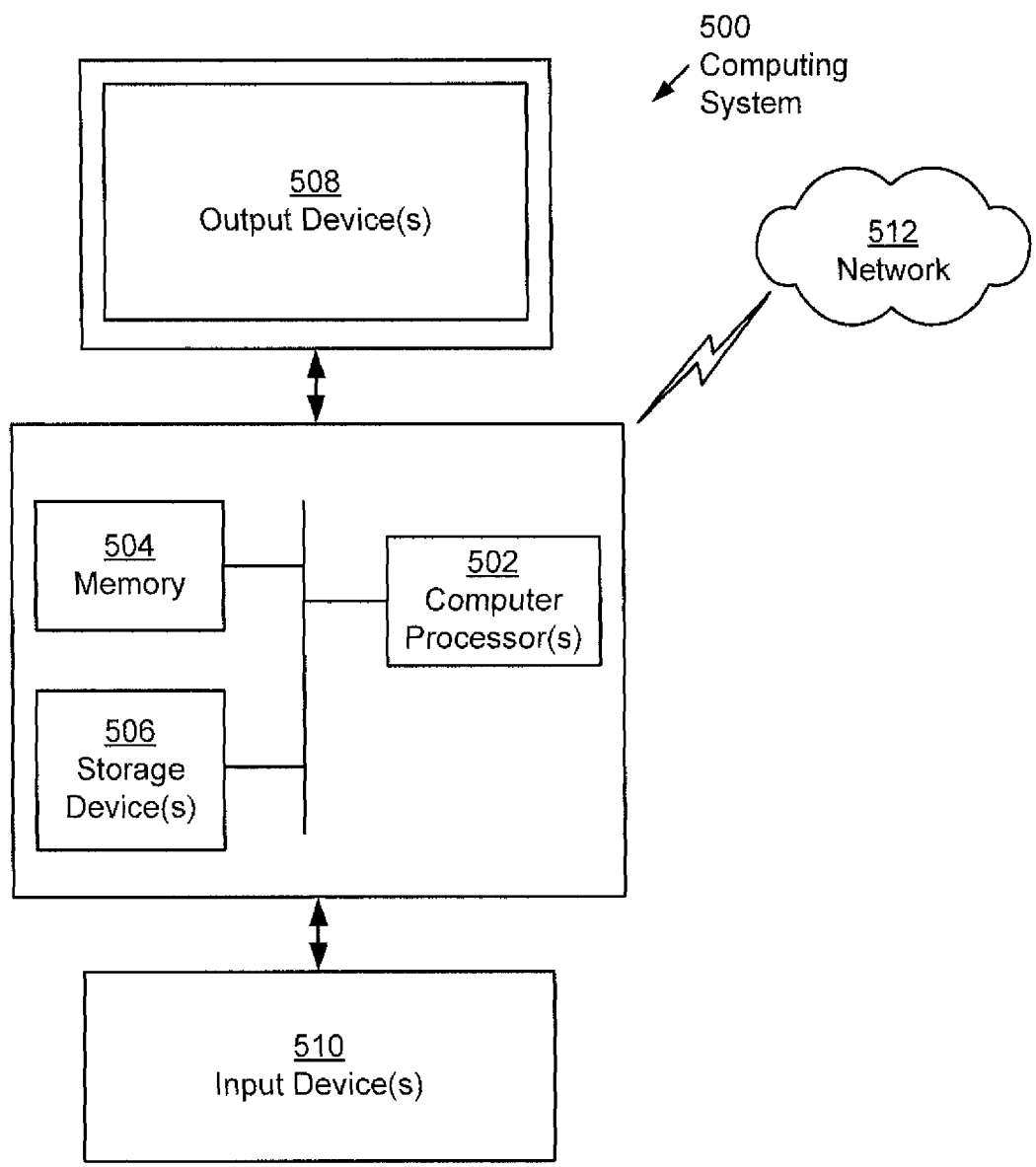
FIG. 5 shows a computer system in accordance with one or more embodiments disclosed herein.

For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments disclosed herein.

One or more elements of the aforementioned computing system (500) may be located at a remote location and connected to the other elements over a network (512). Further, embodiments may be implemented on a distributed system having a plurality of nodes, where each portion may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of embodiments as disclosed herein. Accordingly, the scope of embodiments disclosed herein should be limited only by the attached claims.

What is claimed is:

1. A method, comprising:
    determining that a user has initiated an installation of a secure application on a device owned by the user, the secure application comprising a rich application (RA) part and a trusted application (TA) part, wherein the rich application part operates using resources shared with other applications, and wherein the trusted application part operates in an isolated execution environment with functionality to provide security services to the rich application part;
    installing the RA part of the secure application on the device;
    triggering, by the RA executing on the device, a trusted user interface (UI) session, upon realization that the TA part of the secure application is not installed in the isolated execution environment on the device, wherein the trusted UI session is initiated to enforce user-specific and device-specific security criteria;
    receiving, via the trusted UI session, user credentials for authenticating the user;
    combining the user credentials with a unique identifier of the isolated execution environment in which the TA part of the secure application operates to obtain combined user credentials;
    cryptographically signing the combined user credentials with a cryptographic signature to obtain an authentication object, wherein the authentication object facilitates the enforcement of the user-specific and the device-specific security criteria;
    passing the authentication object to a service provider associated with the secure application for extraction of the user credentials; and
    generating, by an authorization entity, an authorization token permitting the installation of the TA part of the secure application, upon verification of the cryptographically signed authentication object.

2. The method of claim 1, wherein triggering a trusted UI session further comprises:
    requesting, by the RA part of the secure application, a user-binding TA to initiate the trusted UI session, wherein the user-binding TA is a system application that is an integrated part of the isolated execution environment on the device.

3. The method of claim 1, further comprising:
    using the authorization token to complete installation of the secure application by installing the TA part of the secure application within the isolated execution environment on the device.

4. The method of claim 1, further comprising:
    storing a mapping of the user and the unique identifier in a user-to-provider mapping on a back-end server, wherein the user-to-provider mapping is configured to perform the verification of the cryptographic signature and the request for generation of the authorization token.

5. The method of claim 1, wherein the user credentials comprise at least one selected from a group consisting of biometric information, a one-time password (OTP), a username, and a password.

6. The method of claim 1, wherein the device is an Internet-enabled electronic device.

7. The method of claim 1, wherein the trusted UI session is configured to:
    obtain a derived version of the user credentials; and
    delete an original version of the user credentials provided by the user via the trusted UI session,
    wherein the derived version of the user credentials are concatenated with the unique identifier and cryptographically signed to obtain the authentication object.

8. The method of claim 7, wherein the derived version of the user credentials is obtained by one of encrypting the original version of the user credentials or hashing the user credentials.

9. The method of claim 1, wherein when the trusted UT session is executing on the device, the trusted UI session presents a security indicator to the user.

10. The method of claim 9, wherein the security indicator is one selected from a group consisting of a dedicated light on the device, a phrase or sentence known only to the user displayed during the trusted UI session, or a picture provided by the user displayed during the trusted UI session.

11. The method of claim 1, further comprising:
    verifying the cryptographic signature by the back-end server, resulting in a one-to-one binding between a single user, a single device, and a single application executing on the device.

12. A system, comprising:
    a device on which an installation of a secure application is initiated by a user, wherein the device is owned by the user;
    a service provider configured to provide the secure application to be installed on the device, the secure application comprising a rich application (RA) part and a trusted application (TA) part, wherein the rich application part operates using resources shared with other applications, and wherein the trusted application part operates in an isolated execution environment with functionality to provide security services to the rich application part; and a back-end server comprising an authorization entity configured to generate an authorization token permitting installation of the TA part of the secure application, upon verification of an authentication object, wherein, when installation of the secure application is initiated by the user, the RA is configured to request a user-binding TA in the isolated execution environment to initiate a trusted user interface (UI) session by which user credentials are obtained from the user, wherein the authentication object is generated by:
combining the user credentials obtained via the trusted UI session with a unique identifier of the isolated execution environment on the device to obtain combined user credentials, and
cryptographically signing the combined user credentials using a cryptographic signature to obtain the authentication object, wherein the service provider is further configured to receive the authentication object from the RA part of the secure application to check the user credentials, and wherein the back-end server is configured to verify the cryptographically signed authentication object, and, using the verified authentication object, generate the authorization token authorizing the installation of the TA part of the secure application.

13. The system of claim 12, wherein the back-end server is further configured to store a mapping of the user and the unique identifier of the isolated execution environment on the device owned by the user in a user-to-provider mapping.

14. The system of claim 12, wherein the trusted UI session is configured to:
obtain a derived version of the user credentials; and
delete an original version of the user credentials provided by the user via the trusted UI session,
wherein the derived version of the user credentials are combined with the unique identifier and cryptographically signed to obtain the authentication object.

15. The system of claim 14, wherein the derived version of the user credentials is obtained by one of encrypting the original version of the user credentials or hashing the user credentials.

16. The system of claim 12, wherein when the trusted UI session is executing on the device, the trusted UI session presents a security indicator to the user.

17. The system of claim 16, wherein the security indicator is one selected from a group consisting of a dedicated light on the device, a phrase or sentence known only to the user displayed during the trusted UI session, or a picture provided by the user displayed during the trusted UI session.

18. The system of claim 12, wherein the user-binding TA is a system application that is an integrated part of the isolated execution environment on the device.

19. A non-transitory computer readable medium comprising instructions that, when executed by a computer processor, perform a method comprising:
determining that a user has initiated an installation of a secure application on a device owned by the user, the secure application comprising a rich application (RA) part and a trusted application (TA) part, wherein the rich application part operates using resources shared with other applications, and wherein the trusted application part operates in an isolated execution environment with functionality to provide security services to the rich application part;
installing the RA part of the secure application on the device;
triggering, by the RA executing on the device, a trusted user interface (UI) session, upon realization that the TA part of the secure application is not installed in the isolated execution environment on the device, wherein the trusted UI session is initiated to enforce user-specific and device-specific security criteria;
receiving, via the trusted UI session, user credentials for authenticating the user;
combining the user credentials with a unique identifier of the isolated execution environment in which the TA part of the secure application operates to obtain combined user credentials;
cryptographically signing the combined user credentials with a cryptographic signature to obtain an authentication object, wherein the authentication object facilitates the enforcement of the user-specific and the device-specific security criteria;
passing the authentication object to a service provider associated with the secure application for extraction of the user credentials; and
generating, by an authorization entity, an authorization token permitting the installation of the TA part of the secure application, upon verification of the cryptographically signed authentication object.

20. The non-transitory computer readable medium of claim 19, wherein the trusted UI session is configured to execute the steps of:
obtaining a derived version of the user credentials; and
deleting an original version of the user credentials provided by the user via the trusted UI session,
wherein the derived version of the user credentials are concatenated with the unique identifier and cryptographically signed to obtain the authentication object.

21. The non-transitory computer readable medium of claim 20, wherein when the trusted UI session is executing on the device, the trusted UI session presents a security indicator to the user.

22. The non-transitory computer readable medium of claim 19, wherein triggering a trusted UI session further comprises:
requesting, by the RA part of the secure application, a user-binding TA to initiate the trusted UI session, wherein the user-binding TA is a system application that is an integrated part of the isolated execution environment on the device.

* * * * *